United States Patent Office 3,458,356
Patented July 29, 1969

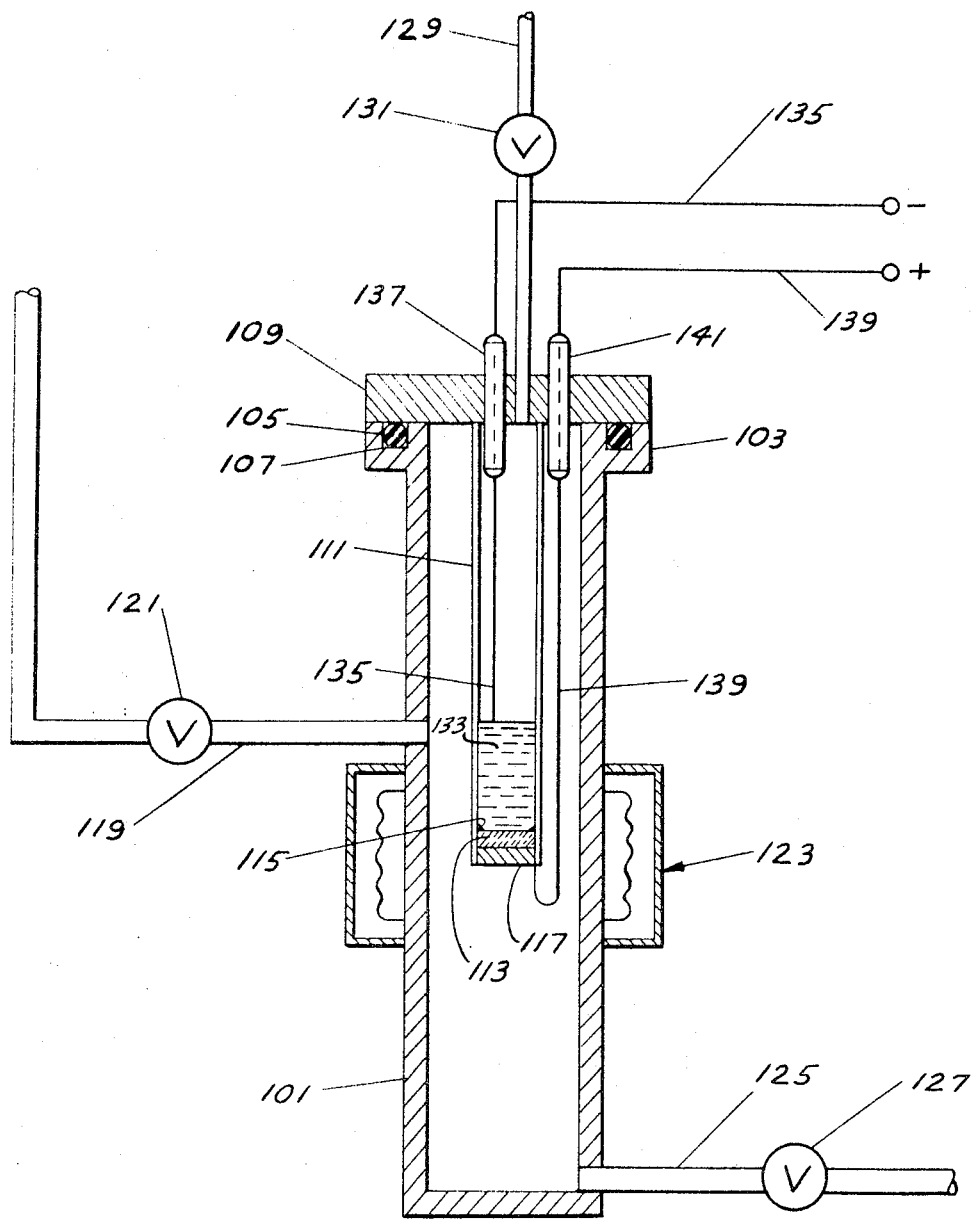

3,458,356
THERMO-ELECTRIC GENERATOR
Joseph T. Kummer, Ann Arbor, and Neill Weber, Dearborn, Mich., assignors to Ford Motor Company, Dearborn, Mich., a corporation of Delaware
Continuation-in-part of application Ser. No. 458,596, May 25, 1965, which is a continuation-in-part of application Ser. No. 245,047, Dec. 17, 1962. This application May 2, 1966, Ser. No. 546,913
Int. Cl. H01m 21/14
U.S. Cl. 136—83            11 Claims This application is a continuation-in-part of our copending application, Ser. No. 458,596, filed May 25, 1965, now abandoned, which in turn is a continuation-in-part of our application, Ser. No. 245,047, filed Dec. 17, 1962, now abandoned.

This invention relates to the conversion of heat energy to electrical energy. In particular, this invention relates to a novel thermo-electric generator wherein a temperature and pressure differential is maintained between reaction zones, a molten alkali metal is converted to ionic form in the zone of greater pressure, the resultant ions pass through a solid electrolyte and are converted into elemental form in the zone of lesser pressure. More particularly, this invention relates to method and means for the generation of electrical energy wherein a molten alkali metal at a first temperature and pressure in a first reaction zone is converted to cations thereof with electron loss to an electrical circuit in electrical communication with the alkali metal in said first zone, said cations pass through a cationically conductive barrier to mass fluid transfer to a second and significantly lower temperature and pressure in a second reaction zone and are reconverted to elemental form upon electron acceptance from said electrical circuit within said second zone.

Referring now to the drawing, there is shown a chemically resistant vessel 101, e.g. stainless steel, ceramic, etc., about 1 inch in internal diameter and 11 inches in length. Tube 101 has a flange 103 at its open end. Flange 103 is provided with a groove or channel 105 in which rests a flexible O ring 107, e.g. rubber or other elastomeric polymer, which provides a vacuum-tight seal when the cover plate 109, formed of stainless steel or other chemically resistant material, is secured to tube 101 by thread, bolt or other conventional attaching means, not shown. Positioned inside tube 101 and affixed to cover plate 109 is a smaller tube 111, e.g. formed of similar material to that of tube 101 and about ½ inch in internal diameter and 6 inches in length. The lower end of tube 111 is closed by a circular plate 113. Plate 113 is formed of a cationically conductive material hereinafter described in detail which is essentially impenetrable to said alkali metal in elemental state. The vacuum-tight seals 115, e.g. glass, ceramic, etc., are provided to secure plate 113 to tube 111 and prevent passage of fluids between plate 113 and tube 111. The lower edge of plate 113 is provided with a thin conductor 117, e.g. a conducting layer of platinum brite paint applied as platinum chloride in an organic reducing agent. Conductor 117 is shown disproportionally thick in relation to the other components to facilitate its location and identification. In practice this platinum layer is porous enough to permit sodium vapor to pass therethrough and sufficiently thick and continuous to conduct electricity.

Tube 101 is provided with an outlet conduit 119 having a valve 121. A vacuum pump, not shown, is connected to conduit 119 for reducing the pressure in tube 101.

Tube 101 is further provided with a heating element 123 and an outlet conduit 125 with valve 127 for removing liquid from tube 101.

An inlet conduit 129 and valve 131 provide means for introducing a liquid into tube 111.

In an embodiment wherein plate 113 is of sodium comprising glass or sodium comprising crystalline solid, tube 111 is partially filled with molten sodium 133. A copper wire negative lead 135 to an external circuit, not shown, extends through an insulator 137 and into the molten sodium 133. Insulator 137 extends through cover 109. A copper wire positive lead 139 to the external circuit passes through an insulator 141 which extends through cover plate 109 and is in electrical connection with the film of platinum 117. In the alternative, lead 135 may be connected directly to tube 111 where tube 111 is a good conductor.

In the operation of this cell, heat is converted directly to electrical energy. Tube 101 is evacuated by pumping means through conduit 121 to a pressure lower than about 0.1 mm. Hg and then sealed. Sodium 133 in tube 111 is heated to a temperature of 300° C. or greater, e.g. 300° to 800° C., while the lower end of tube 101 is maintained at least approximately 100° C. below such temperature by the ambient room temperature or other means, e.g. at about 100° C. Heating of the sodium will ordinarily be external to the generator. Heating means may be incorporated within tube 111 or within or in contact with the walls thereof. A difference in sodium vapor pressure on the two sides of the plate 113 results in the creation of a difference of electrical potential across the plate. As electrons flow through the external circuit, sodium 133 passes through plate 113 as sodium ions which accept electrons from the platinum electrode 117 and return to elemental state.

If the lower part of tube 101 is maintained at a sufficiently low temperature, the sodium condenses here and the pressure in the outer tube 101 becomes the vapor pressure of sodium at such temperature modified by any pressure drop produced by the mass flow of sodium vapor from the platinum 117 to the cooler walls of the outer tube 101.

One advantage of this thermo-electric generator is that the hot and cold parts can be separated to almost arbitrary distances thereby minimizing the effects of wasted heat conduction between the hot and cold parts. In continuous operation, the condensed sodium in the bottom of tube 101 may be heated and returned to the hot zone in tube 111. Preferably, the temperature in tube 101 is high enough to maintain the alkali metal in molten state. With this limitation in mind, it is advantageous to maintain as great a temperature differential between the reaction zones separated by the ionically conductive barrier as is possible. This differential should be at least 100° C. and is preferably at least 200° C.

In the preferred embodiment, the alkali metal reactant is molten sodium. Potassium, lithium and other alkali metals can be used if the separator, plate 113 is of compatible material.

The cationically conductive separtor between the reaction zones serves as a barrier to mass fluid transfer and is essentially impenetrable to the alkali metal reactant in elemental state.

Where the reactant is molten sodium, the separator may be a sodium comprising glass such as the glasses described in our copending application, Ser. No. 507,624, filed Oct. 22, 1965, which is hereby incorporated herein by reference. One such glass contains about 47 to about 58 mol percent $Na_2O$, about 0 to about 15, preferably about 3 to about 12 mol percent $Al_2O_3$ and about 34 to 50 mol percent $SiO_2$. Another glass that may be used contains about 35 to about 65, preferably about 47 to about 58, mol percent $Na_2O$, about 0 to about 30, preferably about 20 to about 30, mol percent $Al_2O_3$, and about 20 to about 50, preferably about 20 to about 30, mol percent $B_2O_3$. Such glasses can be prepared by conventional glass making procedure using the ingredients named in the stated concentrations and firing the same at temperatures of about 2700° F. However, the sustainable working life of glasses in this use is limited.

The separators preferably of crystalline and/or ceramic materials which exhibit unusual chemical and physical resistance to molten alkali metal and low resistivity to cation conductance therethrough. In one preferred embodiment, the separators are polycrystalline bimetal oxides such as beta-alumina and substituted beta-aluminas or the equivalent thereof wherein at least a portion of the sodium ions therein are replaced by ions of another alkali metal. The compositon, properties and preparation of these materials are described in our copending application, Ser. No. 458,596, filed May 25, 1965, which is hereby incorporated herein by reference. Beta-alumina or sodium beta-alumina is a material conventionally represented by the formula $Na_2O \cdot 11Al_2O_3$ and may be thought of as a series of layers of $Al_2O_3$ held apart by columns of linear Al-O bond chains with sodium ions occupying sites between the aforementioned layers and columns.

In another preferred embodiment, the separators are polycrystalline multimetal oxides, e.g. a trimetal oxide wherein the major component by weight is aluminum oxide and the remainder is formed from a major proportion of sodium oxide and a minor proportion by weight of magnesium oxide. The compositon, properties, and preparation of such polycrystalline materials are described in the copending application of Neill Weber, coinventor herein, and Matthew A. Dzieciuch, which application, Ser. No. 500,500, filed Oct. 22, 1965, is incorporated herein by reference.

EXAMPLE 1

A thermo-electric generator in accordance with the generator hereinbefore described in connection with the drawings was operated with a beta-alumina disc serving as plate 113. The disc employed measured 2 mm. in thickness and had a face area of 0.7 cm.$^2$. The preparation of sodium beta-alumina discs is described in detail in our copending application, Ser. No. 458,596, filed May 25, 1965. In one such method, powdered beta-alumina is compressed under high pressures, e.g. above about 10,000 p.s.i. and sintered at a temperature above about 1750° C. for about 1 hour. In separate tests, the sodium 133 in tube 111 was heated to 350° C., 406° C., and 448° C., respectively. The resultant electrical energy generation is set forth below:

| Voltage | Current (milliamperes) | | |
|---|---|---|---|
| | 350° C. | 406° C. | 448° C. |
| 0.1 | 2.9 | 7.9 | 12.7 |
| 0.2 | 1.7 | 5.5 | 9.7 |
| 0.3 | 0.7 | 3.4 | 7.0 |
| 0.4 | 0.0 | 1.5 | 4.7 |
| 0.5 | 0.0 | 0.5 | 2.5 |
| 0.6 | 0.0 | 0.0 | 0.9 |

EXAMPLE 2

The generator of Example 1 is again operated with potassium employed in lieu of sodium in tube 111. The separator, plate 113, is a potassium substituted beta-alumina disc. The potassium in tube 111 is maintained at a temperature above its melting point. This disc is prepared in the following manner:

Powders of $Na_2CO_3$ and $Al_2O_3$ are mixed in such proportions as to provide a mixture equivalent to 60 wt. percent $NaAlO_2$ and 40 wt. percent $Na_2O \cdot 11Al_2O_3$. This mixture is heated to about 2900° F. (about 1593° C.) and forms a molten eutectic which when cooled to room temperature yields a product made up of particles of sodium beta-alumina imbedded in $NaAlO_2$. The $NaAlO_2$ is dissolved in water leaving the powdered sodium beta-alumina which is then ground and/or milled. The resultant granular sodium beta-alumina is immersed overnight in liquid potassium nitrate under an argon blanket and thence removed from the bath. The powder is then pressed into pellets or slabs under a pressure of about 100,000 p.s.i. The pellets or slabs are then sintered in an enclosed platinum-rhodium crucible, in the presence of a coarse powder of the potassium substituted beta-alumina at a temeprature of about 3300° F. (about 1815° C.) for about 1 hour.

The generator of Example 1 is again operated with lithium employed in tube 111. The separator, plate 113, is a lithium substituted beta-alumina disc. The lithium in tube 111 is maintained at a temperature above its melting point. This disc is prepared in the following manner: (a) a sodium beta-alumina slab is immersed overnight in liquid silver nitrate under an argon blanket and thence removed from the bath, (b) the resulting silver substituted sodium beta-alumina slab is immersed overnight in liquid lithium chloride under an argon blanket, and (c) the resultant slab is removed from the bath.

EXAMPLE 3

The generator of Example 1 is again operated with sodium employed in tube 111. The separator, plate 113, is a crystalline trimetal oxide prepared in the following manner:

(1) Magnesium oxide is prepared by calcining basic magnesium carbonate at a temperature of about 816° C.

(2) The magnesium oxide is mixed with finely divided (Linde B) $Al_2O_3$ as a benzene slurry.

(3) The benzene is removed by evaporation.

(4) The magnsium oxide-alumina mixture is then fired at about 1427° C. for about 30 minutes.

(5) The product of 4 is mixed with sodium carbonate as a benzene slurry.

(6) The benzene is removed by evaporation.

(7) The magnesium oxide-alumina-sodium carbonate mixture is then fired at about 1427° C. for about 30 minutes.

(8) The powder product of 7 is then admixed with a conventional wax lubricant (Carbowax) and pressed into cylinders hydrostatically at 100,000 p.s.i.

(9) The wax lubricant is removed by heating the cylinders in air raising the temperature over a 2-hour period to about 600° C. and maintaining such temperature for an additional hour.

(10) The cylinders are then sintered by packing the cylinders in MgO crucibles with packing powder of the same composition, i.e. the powder product of 7, and heating at 1900° C. in air for 15 minutes.

The composition of these cylinders is determined to be 6.3 wt. percent $Na_2O$, 2.18 wt. percent MgO and 91.52 wt. percent $Al_2O_3$.

In separate tests, the generator of Example 1 is again operated with sodium employed in tube 111. The separators, employed as plate 113, are crystalline trimetal oxides prepared by the method heretofore described in this example except as hereinafter noted. The relative amounts of the ingredients employed in preparing these crystalline structures and the sintering temperatures employed were as follows:

Plate A

Composition after sintering:
- $Na_2O$ _____wt. percent__ 7.71
- MgO _____do____ 3.81
- $Al_2O_3$ _____do____ 89.42
- Sintering temperature, ° C. _____ 1850
- Sintering time, min. _____ 30
- Electrical resistivity, D.C. ohm-cm. in air at 20–25° C. _____ 318–500

Plate B

Composition after sintering:

- $Na_2O$ ............... wt. percent .. 8.49
- $MgO$ ............... do .... 3.94
- $Al_2O_3$ ............... Remainder Sintering temperature, °C. .............. 1900
Sintering time, min. ................... 30
Electrical resistivity, D.C., ohm-cm. in air at 20–25° C. ................... 190

Plate C

Powders die pressed at 4,000 p.s.i. and then hydrostatically pressed at 110,000 p.s.i.

Composition after sintering:

- $Na_2O$ ............... wt. percent 7.77
- $MgO$ ............... do .... 3.81
- $Al_2O_3$ ............... Remainder Sintering temperature, °C. .............. 1950
Sintering time, min. ................... 30
Electrical resistivity, D.C., ohm-cm. in air at 20–25° C. ................... 318–500

EXAMPLE 4

The generator of Example 1 is again operated with sodium employed in tube 111. The separator, plate 113, is glass 1–2 mm. in thickness and having a face area of about ⅓ cm.². The composition of the glass employed is about 50 mol. percent $NaAlO_2$ and about 50 mol. percent $NaBO_2$. In this operation, the cathode 117 is a porous layer of graphite. The resultant electrical energy generator is set forth below:

| Voltage: | Current (milliamperes) at 465° C. |
|---|---|
| 0.47 | 0 |
| 0.37 | 1.08 |
| 0.3 | 2.02 |
| 0.22 | 3.15 |
| 0.13 | 4.20 |
| 0.0 | 5.97 |

It is to be understood that this invention is not limited to the examples herein shown and described, but that changes and modifications may be made without departing from the spirit and scope of the invention as defined in the appended claims.

The term "glass" as employed herein means an inorganic product of fusion which has cooled to a rigid condition without crystallizing. See A.S.T.M. C–162–45 T.

The terms "crystal" and "crystalline" as employed herein exclude glass and are generic with respect to "single crystal," "monocrystal" and "polycrystalline."

The term "polycrystalline" as employed herein refers to a plurality of single crystals bound together by sintering or other suitable means to form a cationically conductive object.

The term "cationically conductive separator" as employed herein means an object containing cations which migrate therein upon application of a difference of electrical potential on opposite sides thereof which is sufficient to overcome all other forces acting thereon and through which said cations can be passed upon application of said difference of electrical potential but which is impermeable to elemental alkali metal and compounds thereof.

We claim:

1. A thermo-electric generator wherein heat energy is converted to electrical energy which comprises:
   (1) enclosure means for a first reaction zone,
   (2) enclosure means for a second reaction zone,
   (3) a reaction zone separator which
      (a) separates and essentially completes enclosure of said first reaction zone and said second reaction zone and
      (b) comprises a cationically-conductive solid electrolyte that is essentially impermeable to said alkali metal and ionically conductive with respect to said cations,
   (4) molten alkali metal within said first reaction zone and in fluid communication with said solid electrolyte,
   (5) an electrode within said second reaction zone in electrical connection with said solid electrolyte,
   (6) conduction means for electron flow between said alkali metal within said first reaction zone and said electrode in external relationship with respect to said solid electrolyte,
   (7) inlet means for introducing said alkali metal into said first reaction zone, and
   (8) temperature control means adapted to maintain a temperature in said first reaction zone at least 100° C. in excess of the lowest temperature in said second reaction zone.

2. A thermo-electric generator in accordance with claim 1 wherein said alkali metal is sodium.

3. A thermo-electric generator in accordance with claim 1 wherein said separator comprises a crystalline solid electrolyte consisting essentially of
   (a) ions of oxygen, and
   (b) ions of metal at least a major proportion of which are ions of aluminum
   in crystal lattice combination, and
   (c) cations which migrate in relation to said crystal lattice under influence of an electric field.

4. A thermo-electric generator in accordance with claim 1 wherein said separator comprises a crystalline solid electrolyte consisting essentially of
   (a) ions of oxygen, and
   (b) ions of metal at least about 92 wt. percent of which are ions of aluminum and 0 to about 8 wt. percent of which are ions of metal which have a valence not greater than 2
   in crystal lattice combination, and
   (c) cations of the same alkali metal as that recited in claim 1 which migrate in relation to said lattice when a difference of electrical potential is applied across said solid electrolyte.

5. A thermo-electric generator in accordance with claim 1 wherein said separator comprises a crystalline solid electrolyte at least about 88 wt. percent of which comprises a metal oxide lattice consisting essentially of
   (a) ions of oxygen, and
   (b) ions of metal at least about 95 wt. percent of which are ions of aluminum and about 1 to about 5 wt. percent of which are ions of magnesium
   in crystal lattice combination, and at least about 5 wt. percent of which comprises an alkali metal component consisting essentially of ions of the alkali metal of claim 1 which migrate in relation to said lattice under influence of an electric field when a difference of electrical potential is applied across said solid electrolyte.

6. A thermo-electric generator in accordance with claim 1 wherein said alkali metal is sodium, said solid electrolyte is ionically conductive with respect to sodium ions, and said separator is selected from the group consisting of the separator defined in claim 3, the separator defined in claim 4 and the separator defined in claim 5.

7. A method for generating electrical energy, wherein cations of an alkali metal are passed from a zone of higher temperature and pressure through a solid electrolyte into a zone of lower temperature and pressure and therein converted to elemental metal, which comprises:
   (1) positioning between a first reaction zone and a second reaction zone separation means which
      (a) separate and essentially complete enclosure of said first reaction zone and said second reaction zone, and
      (b) comprises a cationically-conductive solid electrolyte that is essentially impermeable to said alkali metal and ionically conductive with respect to said cations, said solid electrolyte comprising one portion of an electrical circuit, (2) positioning an electrode in electrical connection with said solid electrolyte within said second reaction zone, (3) introducing alkali metal into contact with said solid electrolyte within said first reaction zone, (4) completing said electrical circuit by providing conduction means for electron flow between said alkali metal and said electrode, (5) maintaining said first reaction zone at a temperature sufficient to maintain said alkali metal therein in molten state, and (6) maintaining said second reaction zone at a temperature at least 100° C. below the temperature of said first reaction zone with said molten alkali metal therein to provide a difference of electrical potential across said electrolyte with resultant ionic conductance of said cations through said solid electrolyte and electron flow through the remainder of said circuit.

8. The method of claim 7 wherein said alkali metal in said first reaction zone is maintained at a temperature above about 300° C. and the lowest temperature within said second reaction zone is maintained at least 100° C. lower than the temperature of said sodium in said first reaction zone.

9. The method of claim 8 wherein said alkali metal is sodium and said alkali metal in said first reaction zone is maintained at a temperature in the range of about 300° C. to about 800° C.

10. The method of claim 7 wherein said alkali metal is sodium.

11. The method of claim 7 wherein said cationically conductive separator comprises a polycrystalline object consisting essentially of ions of oxygen and aluminum in crystal lattice combination and alkali metal ions which migrate in relation thereto under influence of an electric field when a difference of electrical potential is applied across said object.

References Cited

UNITED STATES PATENTS 2,301,021  11/1942  Dalpayrat.

WINSTON A. DOUGLAS, Primary Examiner

A. SKAPARS, Assistant Examiner

U.S. Cl. X.R.

136—6, 86, 153